(12) United States Patent
Waterland, III et al.

(10) Patent No.: US 8,916,777 B2
(45) Date of Patent: Dec. 23, 2014

(54) DUST TIGHT AND WATER TIGHT SEAL FOR CONDUIT/JUNCTION BOX CONNECTION

(71) Applicant: VSP Technologies, Inc., Prince George, VA (US)

(72) Inventors: Alfred Fitzgerald Waterland, III, Chesterfield, VA (US); Douglas Thomas Warthan, Chester, VA (US); Brian Alton Blue, Carson, VA (US)

(73) Assignee: Virginia Sealing Products, Inc., Prince George, VA (US)

( * ) Notice: Subject to any disclaimer, the term of this patent is extended or adjusted under 35 U.S.C. 154(b) by 36 days.

(21) Appl. No.: 13/961,065

(22) Filed: Aug. 7, 2013

(65) Prior Publication Data

US 2014/0166341 A1    Jun. 19, 2014

Related U.S. Application Data

(60) Provisional application No. 61/681,325, filed on Aug. 9, 2012.

(51) Int. Cl.
*H02G 3/22* (2006.01)
*H02G 3/08* (2006.01)

(52) U.S. Cl.
CPC .................................. *H02G 3/088* (2013.01)
USPC ............... 174/152 G; 174/153 G; 174/152 R; 174/650; 248/74.1; 248/49; 277/314; 277/602

(58) Field of Classification Search
USPC ............... 174/650, 652, 664, 665, 68.1, 68.3, 174/74 R, 74 A, 77 R, 70 C, 137 R, 135, 174/152 G, 153 G, 152 R, 142, 151; 248/56, 248/49, 62, 74.1, 74.2, 74.3; 16/2.1, 2.2; 277/312, 314, 315, 603, 628, 602
See application file for complete search history.

(56) References Cited

U.S. PATENT DOCUMENTS

| | | | | |
|---|---|---|---|---|
| 4,790,058 A * | 12/1988 | Miller | ............................ | 285/197 |
| 5,406,032 A * | 4/1995 | Clayton et al. | ................... | 248/56 |
| 6,394,464 B1 * | 5/2002 | Moreau | .......................... | 277/603 |
| 8,586,881 B1 * | 11/2013 | Shemtov | ........................ | 174/652 |

* cited by examiner

*Primary Examiner* — Angel R Estrada
(74) *Attorney, Agent, or Firm* — Thomas, Karceski & Karmilovich, P.C.

(57) ABSTRACT

A gasket system is described for use with a conduit and junction box dust-tight seal assembly. The seal assembly includes a two-piece split clamp, each clamp having a shaft portion, a flange portion, a locknut cavity portion and lip portion. The gasket system includes one or more of a shaft gasket, a flange gasket, and a lip gasket that are mounted on and are used in conjunction with the overall seal assembly.

12 Claims, 5 Drawing Sheets

DUST TIGHT AND WATER TIGHT SEAL FOR CONDUIT/JUNCTION BOX CONNECTION

This application claims the benefit of filing of U.S. Application No. 61/681,325 filed Aug. 9, 2012 entitled "Dust-Tight Locknut Gasket", which is incorporated herein by reference in its entirety.

The field of the invention is gasket systems for sealing a connection between a conduit and a junction box into which a conduit is connected.

BACKGROUND

Industrial plants, and especially coal-burning power plants, can be very dusty and dirty environments. Set in this environment, there can be numerous and complicated power cabling and other control and communication cabling systems. In order to protect those cabling systems from the dirty environment in which they are positioned, conduit is widely used as the pathway through which the cabling is installed. Periodically in this cabling and conduit system, there exist junction boxes for any one of numerous purposes. The connection of a conduit when mounted into a junction box is a specific area where dust especially can filter into the inside of a junction box. It is possible that dusty and dirty junction boxes, especially where explosive or flammable coal dust is involved, can result in a dangerous situation. And thus there is row a need to "retrofit" existing junction boxes with dust/water tight seals to comply with new industry requirements. Likewise, it is desirable that these junction boxes and conduit systems are also water-tight to protect the connections that are found in the junction box from unwanted condensation or liquids.

Traditionally, conventional locknuts are used to mechanically secure a conduit into a junction box. In this conventional system, the conduit has a threaded end that feeds into the junction box. Half of the locknut system is threaded onto the conduit and is outside the junction box. A second locknut is threaded onto the conduit on the inside of the junction box. The respective locknuts are then tightened onto each other to secure the conduit to the junction box. FIG. 1 illustrates a conduit 10 that is connected to a junction box 15. An outside locknut 20 is tightened using a second locknut (not shown) inside the junction box 15. The problem is that these conventional locknut systems are designed for mechanical securement, not sealing, and are therefore not effective at preventing dust and water from gaining access into the inside of a junction box.

It is conceivable that conventional, unitary locknut gasket systems can be engineered that have better sealing characteristics around this junction area between a conduit and a junction box. However, the installation of such a new locknut and gasket assembly requires that the cabling that travels through the conduit be disconnected so that a new locknut and gasket may be placed around the conduit and around the junction box opening. This is a substantial undertaking in time and mechanical labor and therefore there is a considerable expense for a retro-fit, one-piece conduit clamp seal.

SUMMARY

Accordingly, it is an object of the present invention to overcome the foregoing drawbacks of leaky connections between a conduit and a junction box. According to the present invention, a sealing system is used that does not require that the entire cabling that is shielded within the conduit and junction box be disconnected. Instead, a dust-tight and water-tight seal is achieved through a split locknut clamp and unique gasket system.

In one example a gasket system is provided for a conduit and junction box dust-tight seal assembly. The seal assembly comprises a two-piece split clamp having a shaft portion adapted to the fit around a conduit. A flange portion on each piece of the split clamp is adapted to secure the split clamp together around the conduit. A locknut cavity portion of the split clamp is adapted to receive a locknut inside the clamp assembly. A lip portion is adapted to be the bottom on the seal assembly and is positioned beneath the locknut and adjacent a surface of a junction box. The gasket system for this assembly includes a shaft gasket comprised of a unitary sheet of compressible material. This sheet has a height and length. The height of the shaft gasket is at least approximately equal to the height of the shaft portion of the split clamp. The length is greater than the circumference of the conduit around which the clamp is mounted.

The shaft gasket may further include a pressure sensitive adhesive coated on a portion of one side thereof that is adapted to be adhered to an inside surface of the shaft portion of one side of the clamp to hold the shaft gasket in place during installation of the seal assembly. The shaft gasket may also include a pressure sensitive adhesive coated on one of the overlapping portions of the shaft gasket sheet. The gasket system may further include a lip gasket. The lip gasket is comprised of a sheet of compressible gasket material and has a circumferential length and width. The width of the lip gasket is larger than the width of the lip portion of the split clamp. The circumferential length of each lip gasket is longer than the circumferential length of the lip portion of each of the split clamps so that the ends of each lip gasket, when fixed on the clamp, will press against the ends of the opposing lip gasket when fixed on the clamp and when the split clamp pieces are secured to each other. Still further, the gasket system may include a flange gasket comprising a sheet of compressible gasket material that is sized to approximately the same dimension of the flange.

DETAILED DESCRIPTION

The criticality of a dust-tight enclosure requires essentially 100% sealing effectiveness which was never achieved with prior gasketing systems/designs. Several limitations prevent the 100% effectiveness of prior sealing attempts.

First, the compression of the respective lip seals and conduit seals will each affect the compression of the other. It is difficult to design and select the exact material thicknesses for both of these seals whereby they uniformly compress together and one seal does not prevent the required compression of the other. The thickness tolerances of conventional sheet and elastomer gasket materials typically prevent the even, uniform compression of both seals. Thickness variation (tolerance) of just a few mils can prevent the seals from compressing as required, resulting in leakage.

Second, the tolerance of the OD of a conduit further aggravates the requirement that both the lip seals and the conduit seals receive sufficient compression 100% of the time. The relatively wide tolerances for rigid conduit is shown below.

| Size | Nominal | Maximum | Max. Radial Diff. (in) |
|---|---|---|---|
| ¼ | 0.540 | | |
| ⅜ | 0.675 | | |
| ½ | 0.840 | 0.855 | 0.008 |
| ¾ | 1.050 | 1.066 | 0.008 |
| 1 | 1.315 | 1.331 | 0.008 |
| 1¼ | 1.660 | 1.676 | 0.008 |
| 1½ | 1.900 | 1.916 | 0.008 |
| 2 | 2.375 | 2.399 | 0.012 |
| 2½ | 2.875 | 2.904 | 0.015 |
| 3 | 3.500 | 3.535 | 0.018 |

Third, in addition to a gasket material requiring a specific range of compression, the design of the butt jointed split joint in the lip gasket as well requires a specific range of compression of both of the gaskets in order for the two butt-ends to mate and form together under pressure. This can only occur if effective compression of the conduit and lip gaskets together all achieve a required design compression, which again is jeopardized by sheet thickness tolerances and conduit OD tolerances.

Finally, the frictional resistance of the lip gasket against a junction box limits the deformation movement of the two butt jointed sections which interferes with their contacting each other with sufficient compression to form a seal. Note, this is not an issue with the current design sponge/foam material.

Because of the thousands of conduit junction box connections that exist in a given coal burning power station, one cannot "custom" design each individual seal/clamp arrangement. A seal design is required that is not negatively impacted by gasket material thickness tolerances or conduit OD tolerances, and that is easily and effectively installed in the field.

Figure 2:
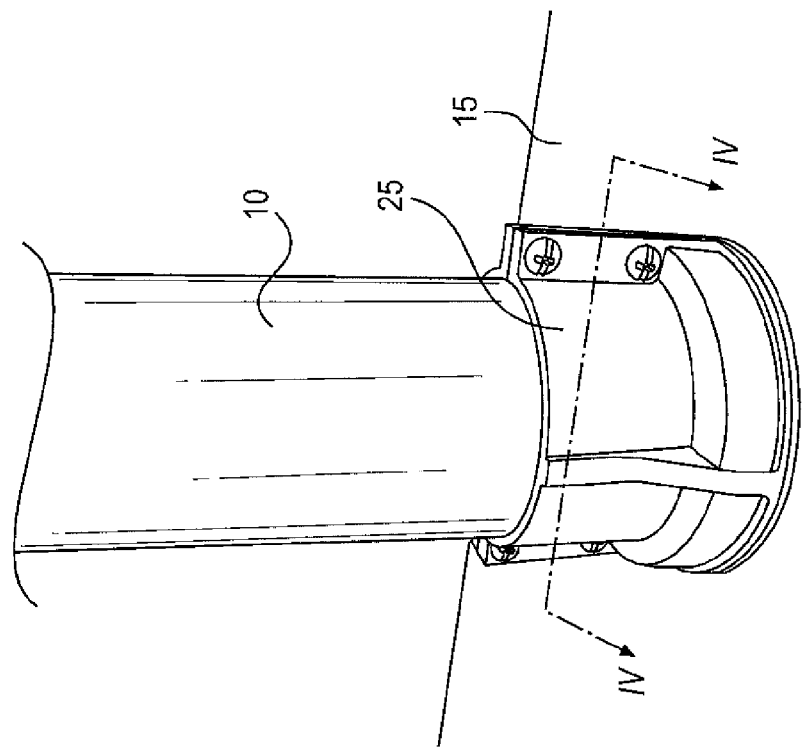
FIG. 2 is a perspective view of a dust-tight and water-tight seal assembly in one example of the present invention.
Figure 1:
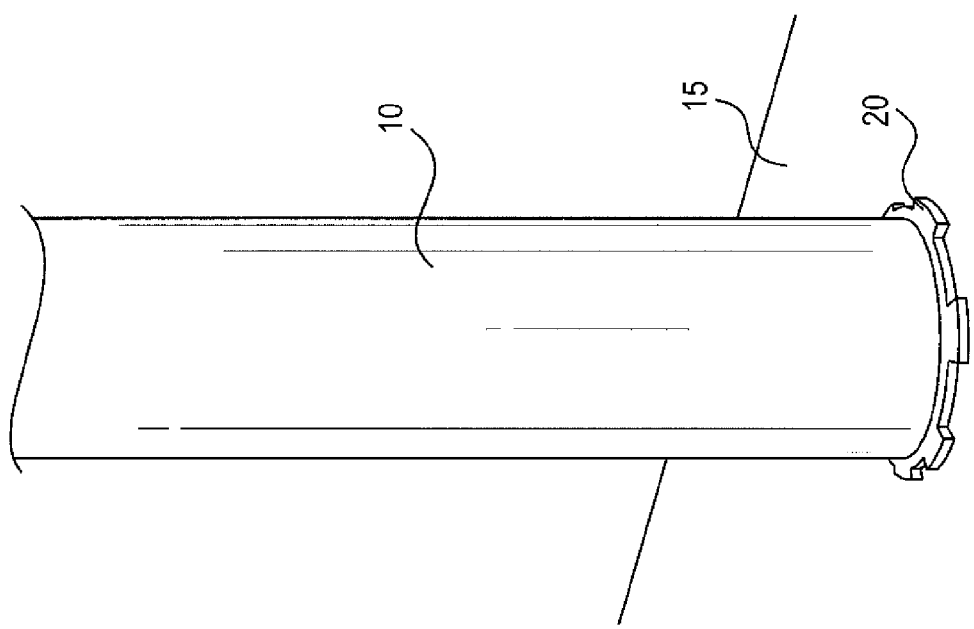
FIG. 1 is a perspective view of a prior art connection of a conduit into a junction box.

Referring now to FIGS. 2-6, an effective seal assembly is shown and described herein. The split clamp seal assembly 25 shown in FIG. 2 is mounted around the connection of a conduit 10 on a junction box 15 as also shown in FIG. 1. The split clamp seal assembly 25 mounts around the locknut 20 that is already in place securing the conduit 10 to the junction box 15. The purpose of the split clamp seal assembly 25 is to prevent dust or water from going through the conduit 10/junction box 15 connection and into the inside of the junction box. The use of simple locknuts 20, one outside as shown in FIG. 1 and one inside, not shown, were never intended for and are not good enough to keep dust and water out of the junction box 15.

The split clamp assembly 25 is able to be mounted at the junction of the conduit 10 and junction box 15 without disconnecting the cabling that is positioned inside the conduit and junction box. The split clamp assembly greatly eases installation at existing locations. However, a simple split clamp alone is not enough to prevent the ingress of dust and water into a junction box. A split clamp requires a gasket system to ensure that there is no ingress of dust and water along the three mating parts (flanges, base, conduit). An effective split clamp seal assembly 25, including effective gaskets, is described further herein.

Figure 3:
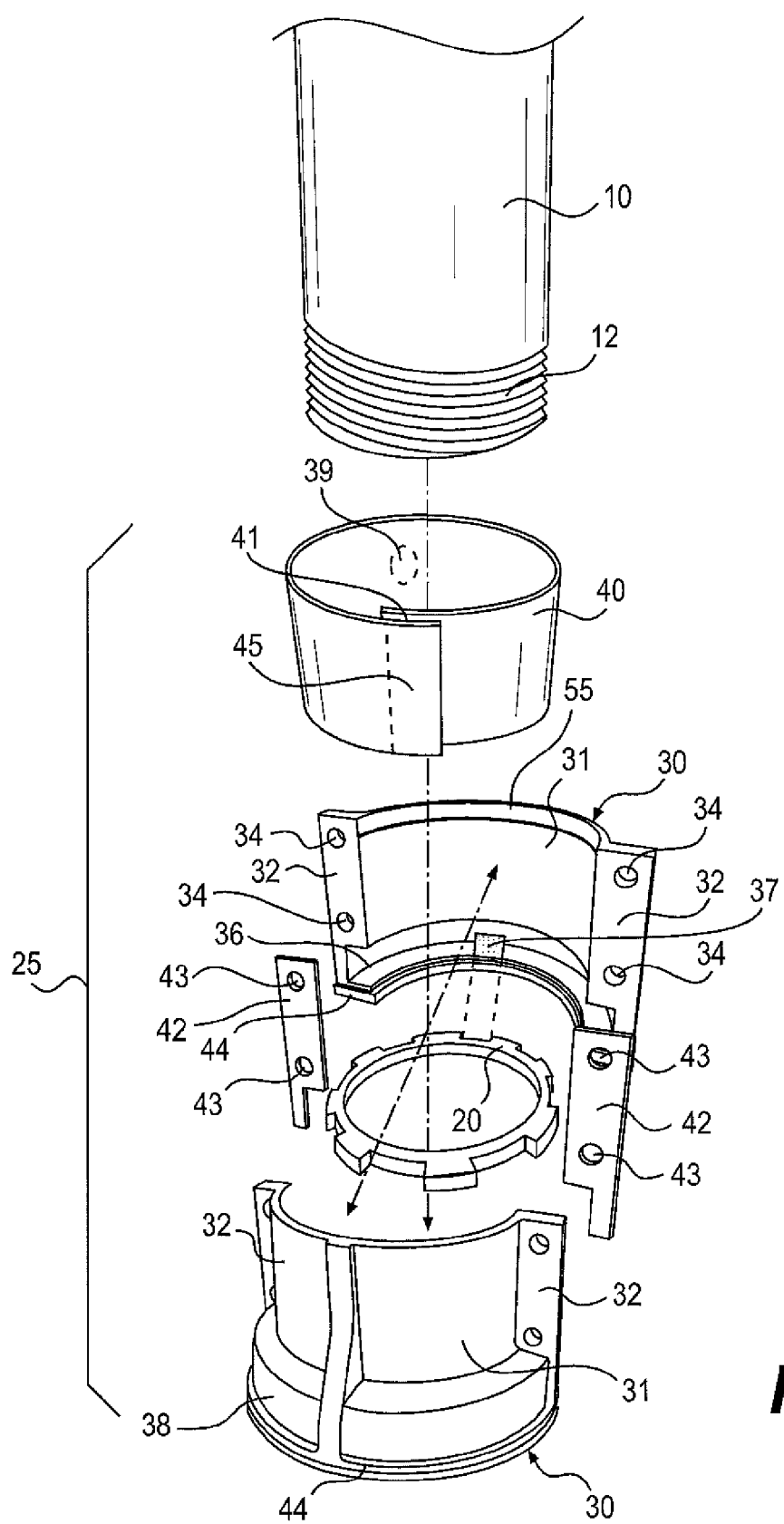
FIG. 3 is an exploded view of the dust-tight and water-tight seal assembly shown in FIG. 2.
Figure 4:
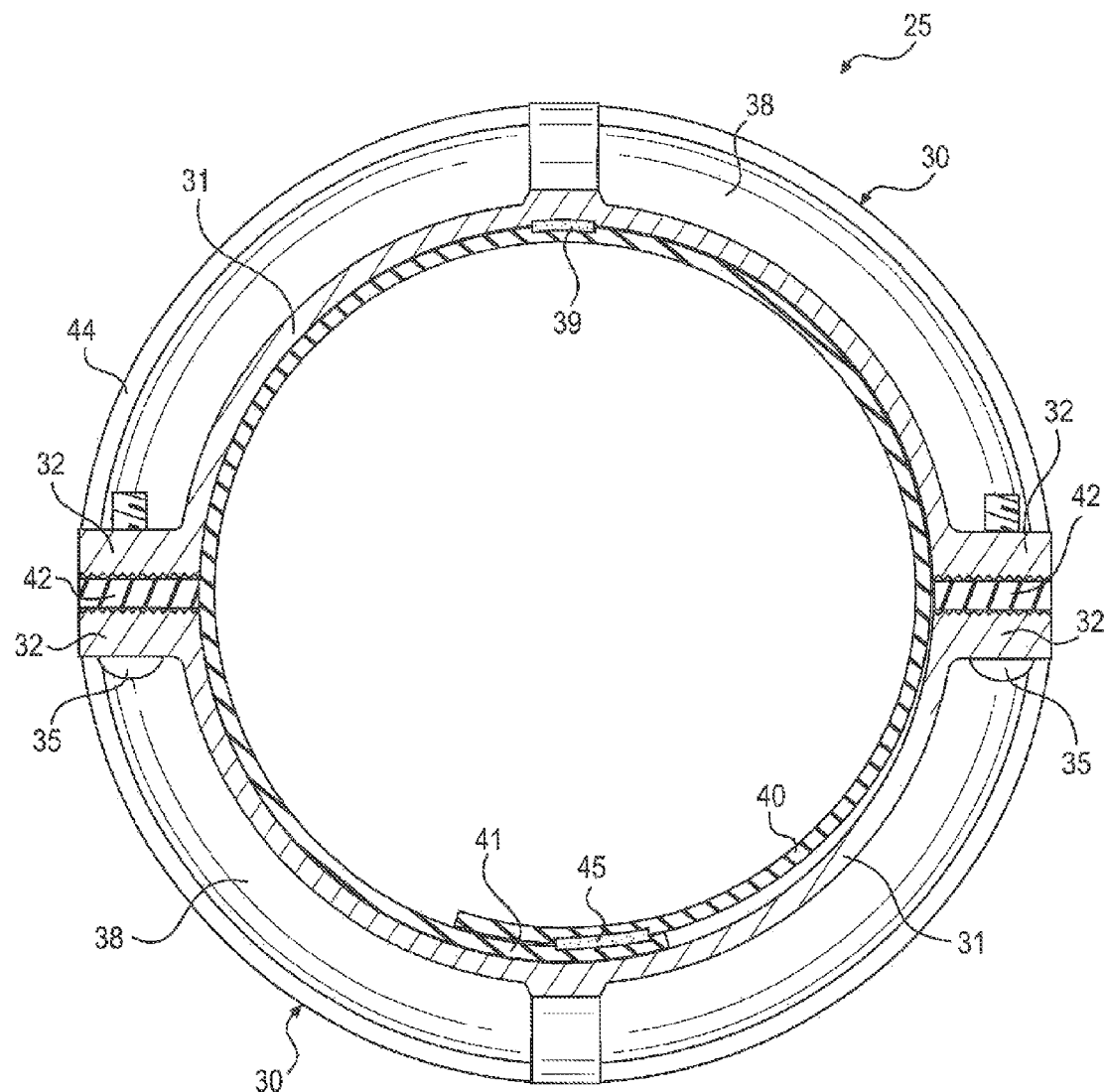
FIG. 4 is a top cross sectional view of the seal assembly taken along lines 4-4 in FIG. 2.
Figure 5:
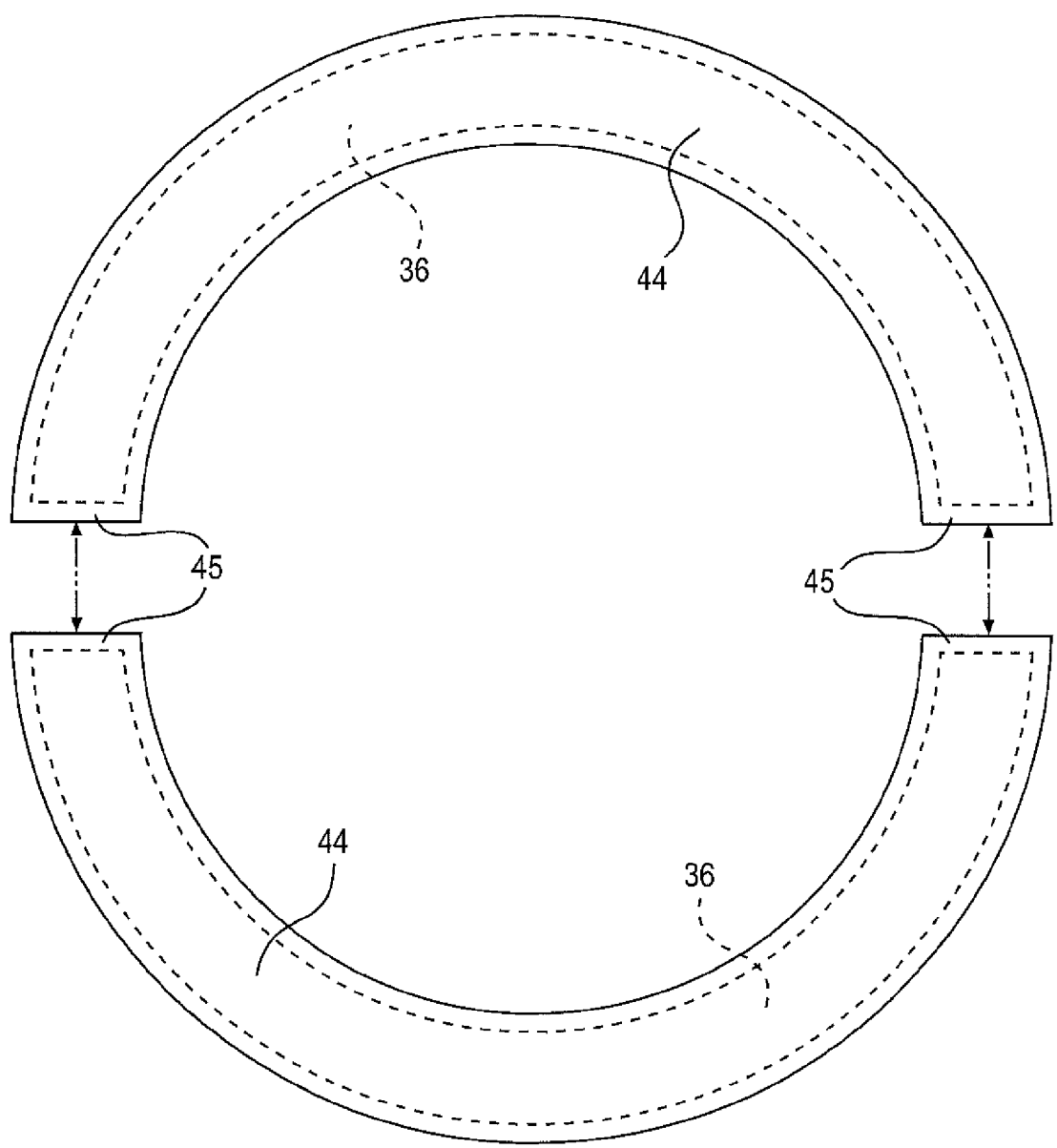
FIG. 5 is bottom view of the seal assembly shown in FIG. 2.
Figure 6:
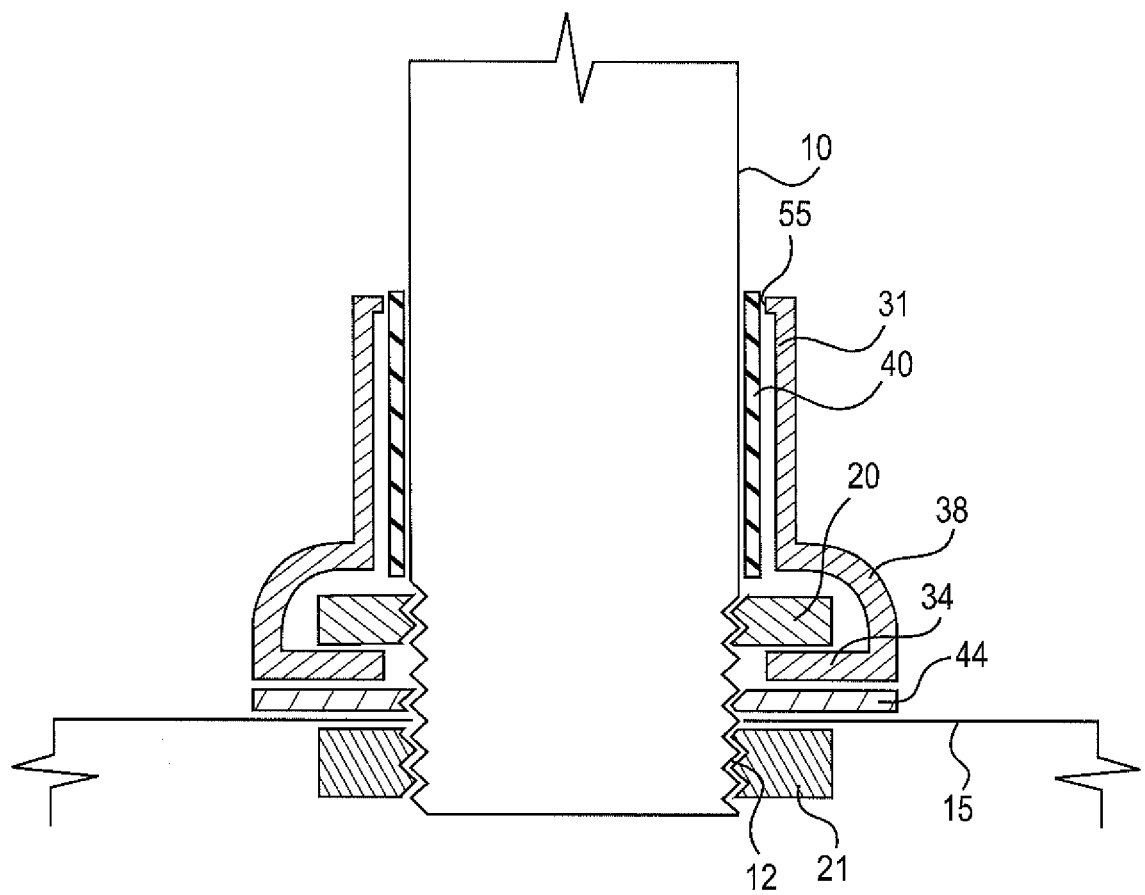
FIG. 6 is a side cross sectional view of the seal assembly shown in FIG. 2.

In FIG. 3, a conduit 10 has a threaded end 12. The conduit 10 has a locknut 20 screwed onto the conduit to engage the outside wall of a junction box (not shown), while a second locknut is screwed onto the threaded end 12 once the conduit has been inserted into a junction box. The two locknuts 20 are then tightened down to secure the conduit 12 onto the wall of the junction box. The split clamp seal assembly 25 is made up of a pair of split clamps 30. Each of the split clamps 30 is adapted to be mounted around half of the round conduit 10. The size of the split clamps 30 is engineered to match the outside diameter of the conduit 10. The split clamps 30 are each made up of a shaft portion 31, a flange portion 32, a locknut cavity portion 38 and a bottom lip portion 36.

The height of the shaft portion 31 is variable depending on the size of the conduit 10 about which the clamps 30 are mounted. The height of the shaft portion 31 may range from about one half of an inch to six inches, or alternatively, about 1½ inches to about 3 inches. In one example, a conduit has an outside diameter of 2⅞ inches (nominal) Max=2.904 inches, the height of the shaft portion 31 is 2⅝ inches. In a still further example, the outside diameter of a conduit may be 1 5/16 inches (nominal) Max=1.331 inches, and the height of the corresponding shaft portion 31 of the split clamp 30 is about 1⅞ inches. As noted, the inside diameter of the shaft portion 31, when the two split clamps 30 are joined, is about the same as the outside diameter of the conduit 10 about which it is mounted. There may be some variance in the inside diameter of the shaft portion to allow for manufacturing variances of conduit generally. Preferably, the inside diameter of the shaft portions 31 are larger than the outside diameter of the conduit 10 by from 0.030 inches to 0.070 inches. In one example, the outside diameter of a conduit is 1 5/16 inches (nominal), and the inside diameter of the shaft portions 31 is 1.385 inches.

The split clamps 30 also include flange portions 32 that are used to secure together the two clamps 30 around a conduit 10. The flange portion 32 is approximately the same height as and along the opposite edges of the shaft portions 31. As illustrated, the flange portion 32 includes a pair of holes 34. Screws 35 (FIG. 4) may be inserted through and threaded onto the various flange holes 34. In one example, one of the clamps 30 will have threaded holes while the other clamp 30 that is paired with it will have untapped holes. Screws 35 may be inserted through the untapped holes and tightened into the threaded holes in order to secure each of the clamps 30 to each other and around a conduit 10. It is also possible that the surface of the flanges 32 may be cast or machined to have vertical grooves or other peaks machined therein. If possible, groove peaks on one flange will mate with the groove valley on the flange of the opposite clamp 30 onto which the flanges line up for securing the clamps to each other.

The clamps 30 also include locknut cavities 38. These locknut cavities 38 are sized to receive a conventional locknut 20. The locknut cavity 38 has an outside diameter and a thickness with some extra room for different-sized locknuts that may already be installed to secure a conduit to a junction box. The locknut cavity 38 may have a notch (metal protrusion) 37 therein that corresponds to the outside diameter extensions of a standard locknut 20 so that the top/outside lock nut does not move when inside the tightened seal assembly 25.

A lip portion 36 defines the bottom of the locknut cavity 38 as well as the bottom surface of each of the clamps 30. The lip portion 36 has a flat bottom, and the thickness of the lip portion is relatively thin and flat. The inside diameter of the lip portion 36, when joined together with the mating clamp 30, defines an inside diameter that is close to the outside diameter of the conduit 10 around which the clamp assembly 25 is mounted. The inside diameter of the lip portion 36 is no less than the outside diameter of the conduit 10. Preferably, it is a little bit larger than the outside diameter of the conduit 10. In some examples, the inside diameter is as follows:

1 inch Conduit: 1.315 inches nominal OD, clamp ID=1.345 inches

2½ inches Conduit: 2.875 inches nominal OD, clamp ID=2.917 inches

¾ inch Conduit: 1.050 inches nominal OP, clamp ID=1.080 inches

The foregoing shaft portions 31, flange portions 32, locknut cavities 38 and lip portions 36 are all hardware that is a unitary metallic piece. This may be made of steel or aluminum or another durable material. This hardware is further enhanced and sealed around a conduit using three different types of gaskets as shown in FIGS. 3-6. The gasket system could be a combination of more or less than these three different types of gaskets.

A shaft gasket 40 is made up of a unitary, flexible sheet of compressible material. As shown, the shaft gasket 40 is generally rectangular in overall shape and has a height and length. The height of the shaft gasket 40 is at least approximately equal to the height of the shaft portion 31 of the split clamp 30. The length of the shaft gasket 40 is greater than the circumferential outside diameter of the conduit 10 around which the shaft gasket is adapted to be mounted. Because the length of the shaft gasket 40 is greater, there is intentionally an overlap 41 of the opposite ends of the shaft gasket 40. The overlap 41 compensates for variance in the conduit circumferential outside diameter (manufacturing tolerance) and for any variance or other difference between the outside diameter of a conduit and the inside diameter of the split clamp shaft portions when joined together around a conduit. The overlap is about 0.1 to 0.5 inches, or at least about 0.1 inches, or alternatively, at least about 0.25 inches.

The thickness of the gasket material of the shaft gasket 40 is relatively thin. The particular thickness will depend on the compressibility of material that is chosen. In one example, the sheet of compressible and resilient material is closed cell ethylene propylene diene monomer (EPDM) sponge elastomer and has a thickness of 1/16 inches. The thickness range generally for the compressible material chosen ranges from about 1/64 inch to 5/32 inch, or alternatively, from about 1/16 inch to 1/8 inch. The gasket material may be, as shown in one example, closed cell EPDM sponge elastomer. It could also be Neoprene sponge, Nitrile sponge, Silicone sponge or any of these materials in a foam construction. The gasket material is referred to herein as a sponge elastomer. The terms foam is also commonly used interchangeably with sponge. The use of the term sponge herein also includes foam materials.

The softness of the sponge elastomer material here and throughout this application requires about 1-25 psi to deform or compress 25%, or alternatively about 2-15 psi to deform or compress 25%. This softness may be compared with the hardness of conventional elastomers that may require about 200 psi or more to deform or compress 25%.

Preferably, the gasket material is not a harder, less resilient or less compressible elastomer or other type of gasket material, because that material is unfavorable for at least the following reasons material selected must be highly compressible, exhibiting very to compressive modulus (high deformation for a given low load); the material should be adaptable to form to and seal the clamp cavity and conduit OD; and the material must compress to the same height when overlapped across itself, and should not prevent compression of other sections of the gasket—for instance, compression of the seal under the raised lip 55 at the top of clamp 30 cannot prevent full/necessary compression of the rest of the strip sealing against the conduit OD/clamp ID.

In one example, a spot of adhesive 39 may be applied to the shaft gasket to position that gasket properly in the shaft portion 31 of the clamp 30. It is preferred that the overlap 41 of the gasket 40 is in contact with the shaft portion 31 and not adjacent the flange portions 32 where there is a seam between the flanges of the split clamps. Therefore, the adhesive 39 attaches the gasket 40 to one side of the shaft portion 31. This adhesive 39 also helps to keep the gasket 40 in place during storage and installation. It is not required for functionality, but it is beneficial to have on the gasket 40.

Additionally, a second adhesive 45 may also be coated on one of the overlapping ends 41 of the shaft gasket 40. In this way, the gasket 40 may be temporarily positioned around a conduit shaft 10 before one or both of the split clamp 30 halves is placed around the gasket and the conduit shaft before being tightened.

Flange gaskets 42 are a required component in the overall seal design and are made of a flexible sheet of compressible material, preferably the same material as the shaft gasket and lip gasket. The addition of the flange gaskets eliminates all or most of the tolerance issues as it is also a highly compressible material that does not prevent the necessary compression of the conduit or lip gaskets. The flange gaskets 42 are sized to the dimensions of the flange 32 and include holes 43 for the screws or bolts that extend through the gasket 42. Generally, a top end of the gasket 42 is proximate the top of the split clamp 30, or stated another way, near the top of the shaft portion 31. The flange gasket extends vertically all the way to the bottom of the clamp 30 and the surface of the bottom of the lip portion 36 of the clamp 30.

In one example, the material that makes up the flange gasket is closed cell EPDM sponge elastomer. As noted earlier, other compressible materials may be used including, but not limited to, Neoprene sponge, Nitrile sponge, Silicone sponge or any of these materials in a foam construction.

Preferably, the gasket material is not a harder, less resilient or less compressible elastomer or other type of gasket material, because that material is unfavorable for at least the following reasons: the compression of the flange gaskets must not interfere with the required compression of the shaft gasket; the material must compress at extremely low bolt loads (~10 in-lb) or else the screw threads will strip; the material must seal at the extremely low bolt loads; and the material must compress to become a very thin (almost imperceptible) thickness.

The thickness of the flange gaskets 42 may be in the range of 1/64 inch to ¼ inch. In one example, the thickness of the flange gasket 42 is 1/16 inch. Alternatively, the thickness may be from 1/64 inch to 3/16 inch.

A lip gasket 44 is made of a sheet of compressible material. The bottom face of the lip portion 36 is adapted to seal down onto the surface of the wall of a junction box. Accordingly, the semi-circular shape of one lip gasket 44 corresponds to the semi-circular shape of the face of the lip portion 36 on each of the clamps 30. An adhesive is applied on one side of the lip gasket 44 to secure the lip gasket onto the bottom surface of the lip portion 36.

The lip gasket 44 has a circumferential length and width. The width of the lip gasket 44 is larger than the width of the bottom of the lip portion 36 of the clamp 30. The circumferential length is greater than the circumferential length of the lip portion 36 onto which the lip gasket 44 is mounted. As a result, the ends 45 of the lip gasket 44 will press against the ends of the opposing lip gasket when the clamps 30 are secured to each other around a conduit.

The lip gasket 44 is formed from a sheet of compressible material. In one example, that material is closed cell EPDM sponge elastomer. As explained earlier, other alternative materials to form the lip gasket include Neoprene sponge, Nitrile sponge, Silicone sponge or any of these materials in a foam construction.

Preferably, the lip gasket 44 material is not a harder, less resilient or less compressible elastomer or other type of gasket material, for the following reasons: the gasket must compress and seal at very low compressive load applied by the back conduit nut; the gasket must adapt to and seal against the potentially rough or uneven surfaces along the top of the junction box; the gasket must compress and form against itself at the edge extensions 45 without limiting compression of this lip gasket or the flange or shaft gaskets; and the gasket seals against itself at the edge extensions 45 with a broad range from low to high compression without damage to the material.

The thickness of the lip gasket 44 may vary with the compressible material that is chosen to form that lip gasket. In one example where the compressible material is closed cell EPDM sponge elastomer, the thickness of the lip gasket is 1/8 inch. This thickness may range from 1/64 inch to 1/4 inch.

Example

The following split clamp seal assemblies were tested for dust and water ingress in accordance with industry test protocol—1/2 inch, 3/4 inch, 1 inch, 1 1/4 inch, 1 1/2 inch, 2 inches, 2 1/2 inches, 3 inches. The gasket material in each case was an EPDM sponge elastomer. Each of the foregoing split clamp seal assemblies were tested according to the IP66 test for dust and water ingress. In each of the foregoing gasket systems, the test was passed and dust and water were excluded from the inside of the junction box.

Sample Installation Process

The following steps may be employed to install a dust-tight locknut as described herein onto an existing conduit junction box connection.

1. Isolate the power to the junction box enclosure.
2. Open the electrical junction box enclosure.
3. Unscrew the existing standard locknut as much as possible
   (Note) if less than two rotations cannot be achieved the electrician will have to unscrew the locknut on the inside of the enclosure a few rotations to achieve an adequate gap between the enclosure and exterior standard locknut.
4. Position a split clamp half around the conduit, facing away from installer. Pay attention to aligning a notch in the locknut cavity between the locknut teeth.
5. Wrap the shaft gasket around the conduit and assure the gasket is completely wrapping around the circumference of the conduit with the ends of the gasket overlapping slightly. Unpeel the pressure sensitive adhesive and tape the adhesive to the gasket where the shaft gasket overlaps itself. Ensure the adhesive end is completely overlapping the gasket and not touching the metal conduit.
6. Place the second split clamp half around the conduit, facing towards installer. Ensure that the standard locknut is inside the locknut cavity and the clamp assembly flanges align properly.
7. Insert all four screws. Partially tighten one screw at a time. Alternating between screws to ensure all four screws are tightened equal amounts so binding does not occur. Tighten all screws of the clamp assembly in this manner unit all screws are hand tight.
8. Retighten the wireway by going inside the enclosure and tightening the standard locknut on the inside of the enclosure.
   (Note) Twisting the Locknut assembly once it is mounted on the wireway is not recommended as it can reposition the gasket and break the seal, especially around the seam of the lip gasket.

Other embodiments of the present invention will be apparent to those skilled in the art from consideration of the specification. It is intended that the specification and Figures be considered as exemplary only, with a true scope and spirit of the invention being indicated by the following claims.

That which is claimed is:

1. A gasket system for a conduit and junction box dust-tight seal assembly; wherein the seal assembly comprises a two-piece split clamp having a shaft portion adapted to fit around a conduit, a flange portion on each piece of the split clamp adapted to secure the split clamp together around the conduit, a locknut cavity portion adapted to receive a locknut inside the clamp, and a lip portion adapted to be the bottom of the clamp and positioned beneath the locknut and adjacent a surface of a junction box; the gasket system comprising:
   a shaft gasket comprising a unitary sheet of compressible material wherein the sheet has a height and a length, the height is at least approximately equal to the height of the shaft portion of the split clamp, and the length is greater than the circumference of the conduit around which the clamp is mounted, whereby the shaft gasket overlaps onto itself when the clamp is mounted around the conduit.

2. The gasket system as described in claim 1, wherein the shaft gasket comprises a pressure sensitive adhesive coated on a portion of one side thereof, and further wherein the shaft gasket is adhered to an inside surface of the shaft portion of one side of the clamp to hold the shaft gasket in place during installation of the seal assembly.

3. The gasket system as described in claim 1, wherein one of the overlapping portions of the shaft gasket sheet comprises a pressure sensitive adhesive coated thereon, whereby the shaft gasket may be adhered to itself in place when wrapped around the conduit during installation of the seal assembly.

4. The gasket system as described in claim 1, wherein the overlapping portions of the shaft gasket are adapted to be oriented so that the overlapping portions are positioned in contact with the shaft portion of the split clamp and not adjacent the flange portions of the split clamp pieces.

5. The gasket system as described in claim 1, wherein the shaft gasket overlaps itself by at least about 0.1 inches.

6. The gasket system as described in claim 1, wherein the shaft gasket overlaps itself by at least about 0.25 inches.

7. The gasket system as described in claim 1, wherein the shaft gasket has a thickness in the range of about 1/64 inch to 5/32 inch.

8. The gasket system as described in claim 1, the gasket system further comprising a flange gasket comprising a sheet of compressible gasket material sized to approximately the same dimensions as the dimensions of the flange.

9. The gasket system as described in claim 8, wherein the flange gasket comprises a pressure sensitive adhesive coated on one side to secure the gasket in place on the flange before installation.

10. The gasket system as described in claim 8, wherein the flange gasket is comprised of a closed cell EPDM sponge material.

11. The gasket system as described in claim 1, the gasket system further comprising a pair of lip gaskets, each lip gasket comprising a sheet of compressible gasket material and having a circumferential length and width, wherein the width of each lip gasket is larger than the width of the lip portion of the clamp, and further wherein the circumferential length of each lip gasket is longer than the circumferential length of the lip portion of each piece of the clamp, whereby the ends of each lip gasket, when fixed on the clamp, will press against the ends of the opposing lip gasket when fixed on the clamp and when the split clamp pieces are secured to each other.

12. The gasket system as described in claim 8, the gasket system further comprising a pair of lip gaskets, each lip gasket comprising a sheet of compressible gasket material and having a circumferential length and width, wherein the width of each lip gasket is larger than the width of the lip portion of the clamp, and further wherein the circumferential length of each lip gasket is longer than the circumferential length of the lip portion of each piece of the clamp, whereby the ends of each lip gasket, when fixed on the clamp, will press against the ends of the opposing lip gasket when fixed on the clamp and when the split clamp pieces are secured to each other.

* * * * *